H. S. PRATT.
TRAP SPRING.
APPLICATION FILED AUG. 11, 1921.
1,409,773.
Patented Mar. 14, 1922.
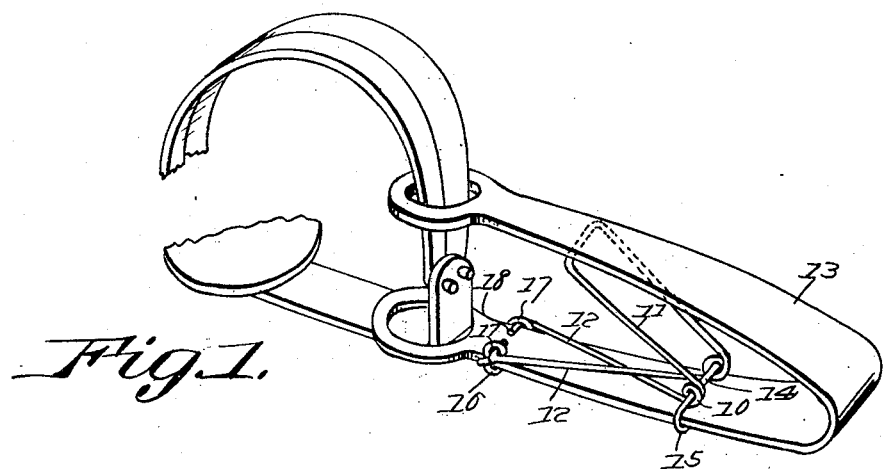
Fig. 1.
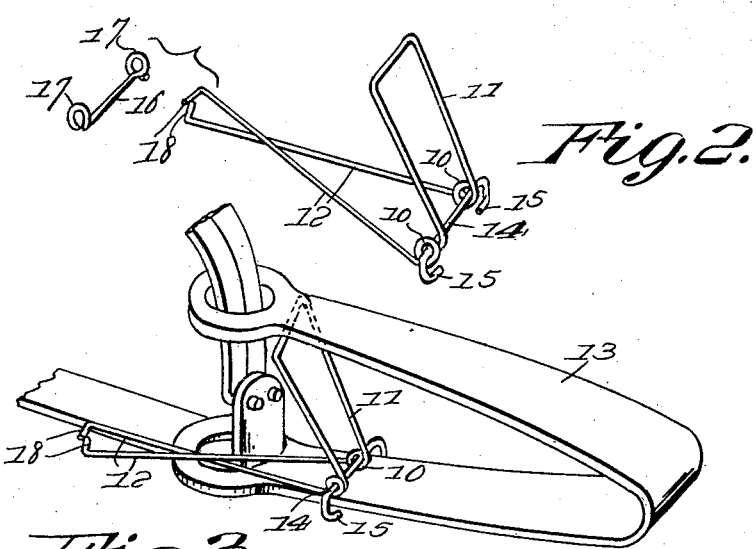
Fig. 2.
Fig. 3.
Inventor
Harvey S. Pratt,
By
Attorney

UNITED STATES PATENT OFFICE.

HARVEY S. PRATT, OF WHITING, IOWA.

TRAP SPRING.

1,409,773.  Specification of Letters Patent.  Patented Mar. 14, 1922.

Application filed August 11, 1921. Serial No. 491,470.

*To all whom it may concern:*

Be it known that I, HARVEY S. PRATT, a citizen of the United States of America, residing at Whiting, in the county of Monona and State of Iowa, have invented new and useful Improvements in Trap Springs, of which the following is a specification.

The object of the invention is to provide a simple and efficient auxiliary or reinforcing spring attachment for the leaf springs of traps of the type ordinarily employed for fur bearing animals, primarily as a means of restoring the efficiency of a trap whereof the spring has lost its resilience or strength by continued use and which without an equivalent of the reinforcing spring is useless and must be discarded together with the remaining portion of the trap of which it forms a part and which in most instances is quite as efficient as when new; and secondarily to strengthen the springs of comparatively new traps wherein by reason of any fall thereof or by reason of the peculiarities of the animals which are being sought, the spring forming a part of traps of this type is ineffective or insufficient; and furthermore to provide a device adapted to be used as a reinforcement of the springs of traps of the type indicated which can readily be applied to the trap spring without the use of tools and without preparation of the trap to receive fastening devices; and with these objects in view the invention consists in a construction and combination of parts of which a preferred embodiment is shown in the accompanying drawings, wherein:

Figure 1 is a view in perspective of a trap spring reinforcing spring applied in the operative position to a trap of the ordinary commercial spring type.

Figure 2 is a view of the reinforcing spring detached.

Figure 3 is a view showing the auxiliary or reinforcing spring as seen in the first step of its application to the trap spring.

The spring embodying the invention consists of a looped blank of spring wire having its sides coiled at an intermediate point to form eyes 10 from which in one direction projects the looped member 11 of the spring and from which in the other direction extends the member represented by the free ends or arms 12 preferably disposed in intersecting relation as indicated, and the means for attaching the member 12 of the auxiliary spring to the main spring 13 of the trap so as to hold said auxiliary spring between and in operative relation with the arms of the main spring, a clip 14 is engaged with the eyes 10 and is disposed in transverse spanning relation with the lower side or arm of the main spring with its terminals returned or bent under as shown at 15 to engage the edges of the main spring. Supplementing this main clip there is also a clip 16 adapted for arrangement in transverse relation to and in contact with the under surface of the lower arm or side of the main spring and provided with terminal eyes 17 adapted for engagement respectively by the inturned terminal fingers 18 at the extremities of the sides of the spring blank forming the member 12 of the auxiliary spring.

In applying the auxiliary or reinforcing spring to the trap, which as above indicated may be accomplished without the use of tools, the clip 14 is first engaged with the eyes 10 and is engaged with the main spring of the trap at the reduced or narrow portion thereof adjacent to the terminal eyes 18 thereof as indicated in Figure 3, the proportions of the parts being such that at this narrow part of the main spring the clip 14 will readily drop over the main spring and from this position the clip may be slid outward toward the looped end of the main spring until it binds. This position having been reached and the looped member of the auxiliary spring being forced laterally under the upper arm of the main spring, the terminals of the side arms of the auxiliary spring may be spread to permit of the insertion of the terminal fingers thereof into the eyes at the extremities of the clip 16,—thus completing the attachment of the auxiliary spring.

The device while adapted primarily for application to and use in connection with the springs of traps which having been used for a considerable time have become weakened or have lost to a great extent their resilience or spring quality and which are ordinarily cast aside as worthless on this account notwithstanding the fact that the remaining portion of the trap is in perfectly good condition, may also be used to advantage in connection with a new trap where an increased strength of the main spring is required by reason of peculiarities of the game which is sought and guard against any possibility of the release of the animal after the trap has been sprung.

Having described the invention, what is claimed as new and useful is:—

1. A reinforcing means for a trap spring consisting of an auxiliary spring adapted for interposition between the arms or members of the trap spring and having one of its members provided with means for engaging one of the arms of the main spring, said auxiliary spring having intermediate coiled eyes and a clip extending through said eyes and terminally engaged with the edges of the main spring.

2. A reinforcing means for a trap spring consisting of an auxiliary spring adapted for interposition between the arms or members of the trap spring, a clip disposed in transverse relation to and in contact with the under surface of one of the arms of the main spring and provided with terminal eyes, the supplemental spring being provided with inturned terminal fingers engaged with said eyes and having a springing tendency towards each other.

3. A reinforcing means for a trap spring consisting of an auxiliary spring adapted for interposition between the arms or members of the trap spring and having one of its members provided with means for engaging one of the arms of the main spring and provided at the junction between said members with coil eyes and said fastening means consisting of clips disposed transversely of the trap spring and engaged with the edges thereof, one of said clips extending through the intermediate eyes of the auxiliary spring and the other having eyes engaged by inturned terminal fingers at the extremities of the sides of the auxiliary spring.

4. As an article of manufacture an auxiliary reinforcing spring for spring traps, the same consisting of a looped blank of spring wire of which the sides are provided at an intermediate point with coils forming eyes and of which the free ends forming one member of the spring are arranged in intersecting relation and are provided with inturned terminal fingers, a clip extending through said eyes and provided with returned terminals, and a second clip having terminal eyes for engagement by said fingers.

In testimony whereof he affixes his signature.

HARVEY S. PRATT.